US011489558B2

(12) United States Patent
Wang et al.

(10) Patent No.: US 11,489,558 B2
(45) Date of Patent: Nov. 1, 2022

(54) WIRELESS COMMUNICATION CIRCUITRY AND WIRELESS COMMUNICATION METHOD

(71) Applicant: MEDIATEK INC., Hsin-Chu (TW)

(72) Inventors: Wei-Chen Wang, Hsinchu (TW);
Chia-Wei Dai, Hsinchu (TW);
Ray-Kuo Lin, Hsinchu (TW);
Meng-Hsiang Lai, Hsinchu (TW);
Ting-Che Tseng, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 16 days.

(21) Appl. No.: 17/137,366

(22) Filed: Dec. 30, 2020

(65) Prior Publication Data
US 2021/0218440 A1 Jul. 15, 2021

Related U.S. Application Data

(60) Provisional application No. 62/958,772, filed on Jan. 9, 2020.

(51) Int. Cl.
| | |
|---|---|
| *H04B 7/024* | (2017.01) |
| *H04B 7/06* | (2006.01) |
| *H04B 7/0417* | (2017.01) |
| *H04L 25/02* | (2006.01) |
| *H04B 3/52* | (2006.01) |

(52) U.S. Cl.
CPC ............. *H04B 7/024* (2013.01); *H04B 3/52* (2013.01); *H04B 7/0417* (2013.01); *H04B 7/0626* (2013.01); *H04L 25/0204* (2013.01)

(58) Field of Classification Search
CPC ............. H04W 72/082; H04W 84/12; H04W 74/0808; H04W 68/00; H04W 36/06; H04W 28/16; H04W 72/0453
See application file for complete search history.

(56) References Cited

U.S. PATENT DOCUMENTS

| | | | |
|---|---|---|---|
| 2016/0285611 A1* | 9/2016 | Fischer | ............... H04W 72/082 |
| 2018/0359763 A1 | 12/2018 | Kenkel | |
| 2019/0246324 A1 | 8/2019 | Cizdziel | |
| 2019/0342795 A1* | 11/2019 | McFarland | ........... H04W 28/18 |

FOREIGN PATENT DOCUMENTS

TW       201904314 A      1/2019

\* cited by examiner

*Primary Examiner* — David S Huang
(74) *Attorney, Agent, or Firm* — Winston Hsu

(57) ABSTRACT

The present invention provides a wireless communication circuitry including a processor, a communication path and a channel detection path. The communication path is configured to wirelessly communicate with an electronic device by using a first channel. The channel detection path is configured to detect at least one channel different from the first channel to generate a detection result while the communication path is wirelessly communicating with the electronic device by using the first channel. The processor determines a second channel based on the detection result, and the processor controls the communication path to switch to the second channel from the first channel to communicate with the electronic device.

12 Claims, 4 Drawing Sheets

WIRELESS COMMUNICATION CIRCUITRY AND WIRELESS COMMUNICATION METHOD

CROSS REFERENCE TO RELATED APPLICATIONS

This application claims the priority of U.S. Provisional Application No. 62/958,772, filed on Jan. 9, 2020, which is included herein by reference in its entirety.

BACKGROUND

In a region having many basic service sets (BSS), the BSSs may interfere each other if the operating channels are overlapped, and the quality of the wireless communication may also be interfered by digital phones. In order to have better wireless communication performance (Wi-Fi performance), the device is preferred to use the channel with fewer users/devices, however, the efficiency of a receiver may be influenced if a channel scanning operation is performed to determine a better channel. In addition, if the device prepares to use a dynamic frequency selection (DFS) channel, the device needs to continuously monitor the DFS channel (i.e. monitor for presence of Radar signals) for several minutes to satisfy a channel availability check (CAC) requirement.

SUMMARY

It is therefore an objective of the present invention to provide a wireless communication circuitry comprising a dedicated path for performing an off-channel CAC, a clear channel detection and an automatic channel selection, to solve the above-mentioned problems.

According to one embodiment of the present invention, a wireless communication circuitry comprising a processor, a communication path and a channel detection path is disclosed. The communication path is configured to wirelessly communicate with an electronic device by using a first channel. The channel detection path is configured to detect at least one channel different from the first channel to generate a detection result while the communication path is wirelessly communicating with the electronic device by using the first channel. The processor determines a second channel based on the detection result, and the processor controls the communication path to switch to the second channel from the first channel to communicate with the electronic device.

According to another embodiment of the present invention, a wireless communication method is disclosed. The wireless communication method comprises the steps of: controlling a communication path to wirelessly communicate with an electronic device by using a first channel; controlling a channel detection path to detect at least one channel different from the first channel to generate a detection result while the communication path is wirelessly communicating with the electronic device by using the first channel; determining a second channel based on the detection result; and controlling the communication path to switch to the second channel from the first channel to communicate with the electronic device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
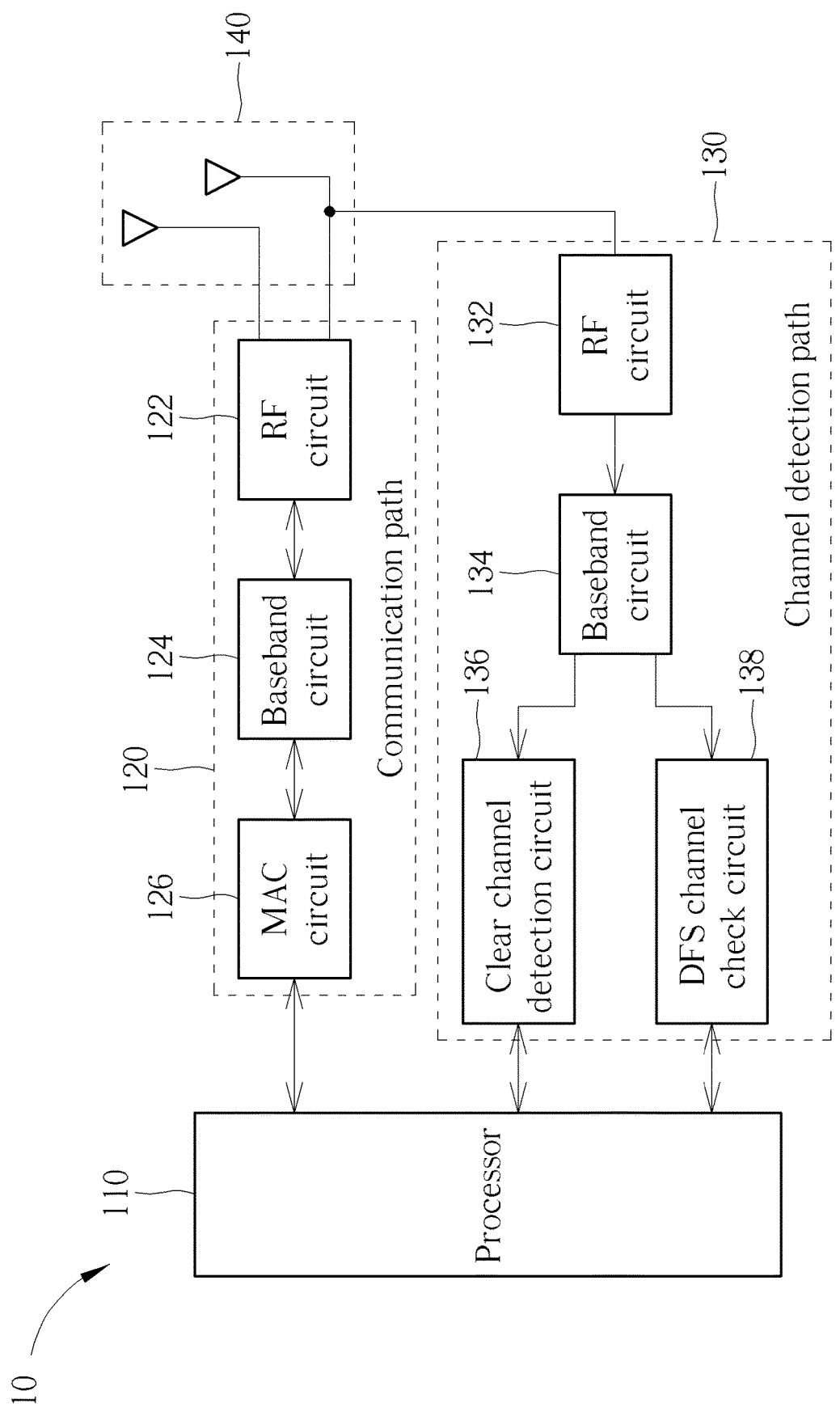
FIG. 1 is a diagram illustrating a wireless communication circuitry according to one embodiment of the present invention.

FIG. 1 is a diagram illustrating a wireless communication circuitry 10 according to one embodiment of the present invention. As shown in FIG. 1, the wireless communication circuitry 10 comprises a processor 110, a communication path 120, a channel detection path 130 and an antenna module 140. The communication path 120 is configured to communicate with other electronic devices, that is the communication path 120 is configured to process data from the processor 110 to generate a transmission signal to another electronic device via the antenna module 140, and the communication path 120 is further configured to process received signal from the antenna module 140 to generate processed signal to the processor 110. In this embodiment, the communication path 120 comprises at least a radio frequency (RF) circuit 122 supporting 2.4 GHz and 5 GHz, a baseband circuit 124 supporting 2.4 GHz and 5 GHz and a media access control (MAC) circuit 126 supporting 2.4 GHz and 5 GHz. The data from the processor 110 can be sequentially processed by the MAC circuit 126, the baseband circuit 124 and the RF circuit 122 to generate the transmission signal to the antenna module 140; and the RF circuit 122 can receive the radio signal, and the received signal is sequentially processed by the RF 122, the baseband circuit 124 and the MAC circuit 126 to generate the processed data to the processor 110. The channel detection path 130 is a dedicated path configured to search an available and clear channel different from an in-use channel used by the communication path 120. In this embodiment, the channel detection path 130 is only used to determine the available channel different from the in-use channel used by the communication path 120, and the channel detection path 130 only receives the signal from the antenna module 140 without transmitting valid signals to other electronic devices via the antenna module 140. The channel detection path 130 comprises a RF circuit 132 supporting 2.4 GHz and 5 GHz, a baseband circuit 134, a clear channel detection circuit 136 and a DFS channel check circuit 138. The RF circuit 132 is configured to receive a signal from the antenna module 140, and the received signal is sequentially processed by the RF 132 and the baseband circuit 134 to generate the processed signal to the clear channel detection circuit 136 and the DFS channel check circuit 138.

Because functions and detailed circuits of the RF circuit 122/132, the baseband circuit 124/134 and the MAC circuit 126 are known by a person skilled in the art, and the embodiment focuses on the operations of the clear channel detection circuit 136 and the DFS channel check circuit 138, the detailed description about the RF circuit 122/132, the baseband circuit 124/134 and the MAC circuit 126 are omitted here.

In the embodiment shown in FIG. 1, when the communication path 120 uses a channel (i.e. in-use channel) to communicate with the other electronic device, the clear channel detection circuit 136 of the channel detection path 130 can measure or detect clearness of the scanned channels to generate a detection result, where the clearness of each channel can be determined based on a channel load and/or the received power of the corresponding RF signal. In one embodiment, the channel load may be determined by an air time of the RF signal (i.e. amount of time for the device to send data), for example, the channel load may be an air time of the RF signal whose power is greater than a threshold. In addition, when the clear channel detection circuit 136 detects the clearness of the scanned channels, the communication path 120 does not suspend the operation, that is the communication path 120 keeping communicating with the other electronic device via the antenna module 140. The measurement result generated by of the clear channel detection circuit 136 can be used by the processor 110 to determine a specific channel that is better than the in-use channel, and the processor 110 may control the communication path 120 to switch to this specific channel to communicate with the other electronic device. In addition, if the specific channel determined according to the detection result generated by of the clear channel detection circuit 136 is a DFS channel, the DFS channel check circuit 138 may continuously monitor this DFS channel to generate a detection result until the off-channel CAC criterion is passed. Before this DFS channel passes the off-channel CAC criterion, the communication path 120 keeps using the original in-use channel to communicate with the other electronic device.

The processor 110 has an automatic channel selection mechanism to switch the channel used by the communication path 120. Specifically, when the in-use channel of the communication path 120 is crowded with other co-channel interference, the processor 110 can switch the in-use channel to another channel (e.g. the specific channel mentioned above) based on measurement result of the clear channel detection circuit 136 and the CAC check result of the DFS channel check circuit 138. In light of above, because the specific channel can be determined and the specific channel can pass the off-channel CAC criterion if the specific channel is the DFS channel when the communication path 120 keeps using the in-use channel to communicate with the other electronic device, the communication path 120 can quickly switch to the determined specific channel when the current in-use channel suffers the interference, to maintain the performance of the wireless communications.

Figure 2:
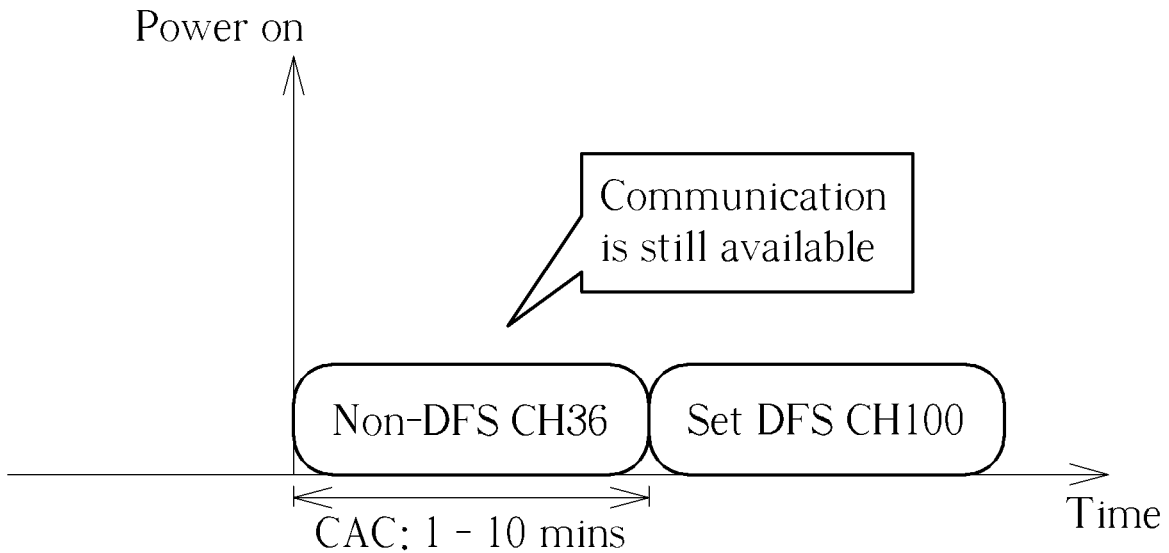
FIG. 2 is a timing diagram of the wireless communication circuitry according to a first embodiment of the present invention.

FIG. 2 is a timing diagram of the wireless communication circuitry 10 according to a first embodiment of the present invention. As shown in FIG. 2, if the wireless communication circuitry 10 is powered on and the default channel is Wi-Fi channel-100 (CH100, DFS channel), the communication path 120 directly uses the other non-DFS channel such as Wi-Fi channel-36 to communicate with other electronic device(s), and the DFS channel check circuit 138 starts to monitor the Wi-Fi channel-100 several minutes (e.g. 1-10 minutes) for the CAC criterion. After the Wi-Fi channel-100 passes the CAC criterion, the processor 110 immediately controls the communication path 120 to switch the Wi-Fi channel-36 to the Wi-Fi channel-100. In this embodiment, although the default channel is the DFS channel that cannot be used immediately after the wireless communication circuitry 10 is powered on, the communication path 120 can use another non-DFS channel to communicate with other devices, and the DFS channel check circuit 138 within the dedicated path can execute the CAC operation immediately, to make the communication path 120 capable of switching to the default DFS channel as soon as possible.

Figure 3:
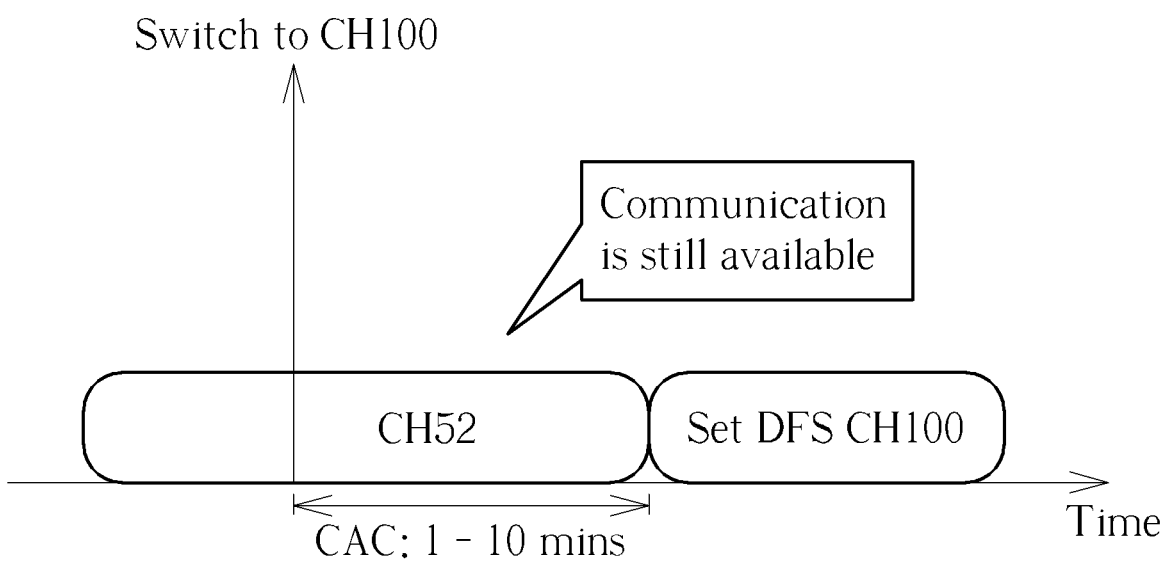
FIG. 3 is a timing diagram of the wireless communication circuitry according to a second embodiment of the present invention.

FIG. 3 is a timing diagram of the wireless communication circuitry 10 according to a second embodiment of the present invention. As shown in FIG. 3, assuming that the wireless communication circuitry 10 has been communicated with the other electronic device by using Wi-Fi channel-52, if the user manually set a command to use the Wi-Fi channel-100 (DFS channel), the communication path 120 keeps using the Wi-Fi channel-52 without switching to the Wi-Fi channel-100. At this time, the DFS channel check circuit 138 starts to monitor the Wi-Fi channel-100 several minutes for the CAC criterion. After the Wi-Fi channel-100 passes the CAC criterion, the processor 110 immediately controls the communication path 120 to switch the Wi-Fi channel-52 to the Wi-Fi channel-100. In this embodiment, when the user would like to switch the in-use channel to a DFS channel, the communication path 120 still use the original channel for the wireless communication while the DFS channel check circuit 138 monitors the DFS channel set by the user, therefore, the preparation for switching to the DFS channel can be completed without affecting the operation of the communication path 120.

Figure 4:
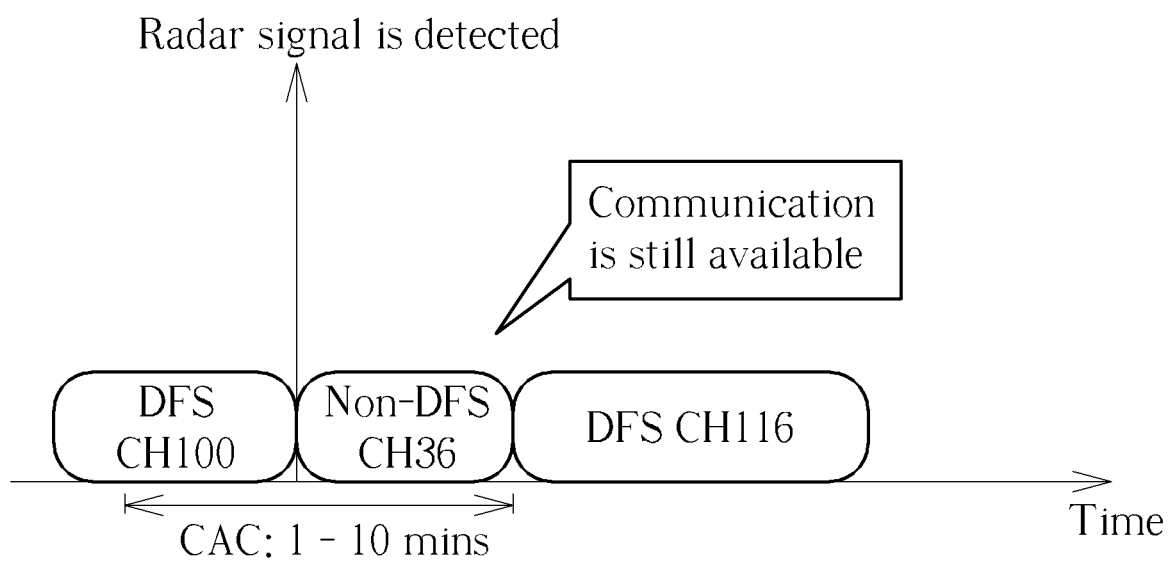
FIG. 4 is a timing diagram of the wireless communication circuitry according to a third embodiment of the present invention.

FIG. 4 is a timing diagram of the wireless communication circuitry 10 according to a third embodiment of the present invention. As shown in FIG. 4, assuming that the wireless communication circuitry 10 has been communicated with the other electronic device by using Wi-Fi channel-100 (DFS channel), without suspending the operation of the communication path 120, the clear channel detection circuit 136 starts to detect quality of the channels for the processor 110 to determine one or more clear channels, and if the one or more clear channels have a DFS channel such as Wi-Fi channel-116, the DFS channel check circuit 138 starts to monitor the Wi-Fi channel-116 several minutes for the CAC criterion. In FIG. 4, if a Radar signal is detected and the Wi-Fi channel-100 cannot be used, the processor 110 immediately controls the communication path 120 to switch the Wi-Fi channel-100 to the Wi-Fi channel-36 (non-DFS channel) to keep communicating with the other electronic device. Then, after the Wi-Fi channel-116 passes the CAC criterion, the processor 110 immediately controls the communication path 120 to switch the Wi-Fi channel-36 to the Wi-Fi channel-116. In this embodiment, by using the DFS channel check circuit 138 within the dedicated path to monitor the Wi-Fi channel-116 to pass the CAC criterion, once the in-use DFS channel is not allowed for the signal transmission due to detection of Radar signals, the communication path 120 can switch to the non-DFS channel such as Wi-Fi channel-36 for a short time, then the communication path 120 can switch to the Wi-Fi channel-116 as soon as possible. In one embodiment, if the Wi-Fi channel-116 passes the CAC criterion before the Radar signal is detected, the communication path 120 may directly switch the Wi-Fi channel-100 to the Wi-Fi channel-116, without using any non-DFS channel between the Wi-Fi channel-100 and the Wi-Fi channel-116. In addition, because the DFS channel is generally more clear than the non-DFS channel, the embodiment shown in FIG. 4 can make the communication path 120 have better quality for the wireless communication.

Figure 5:
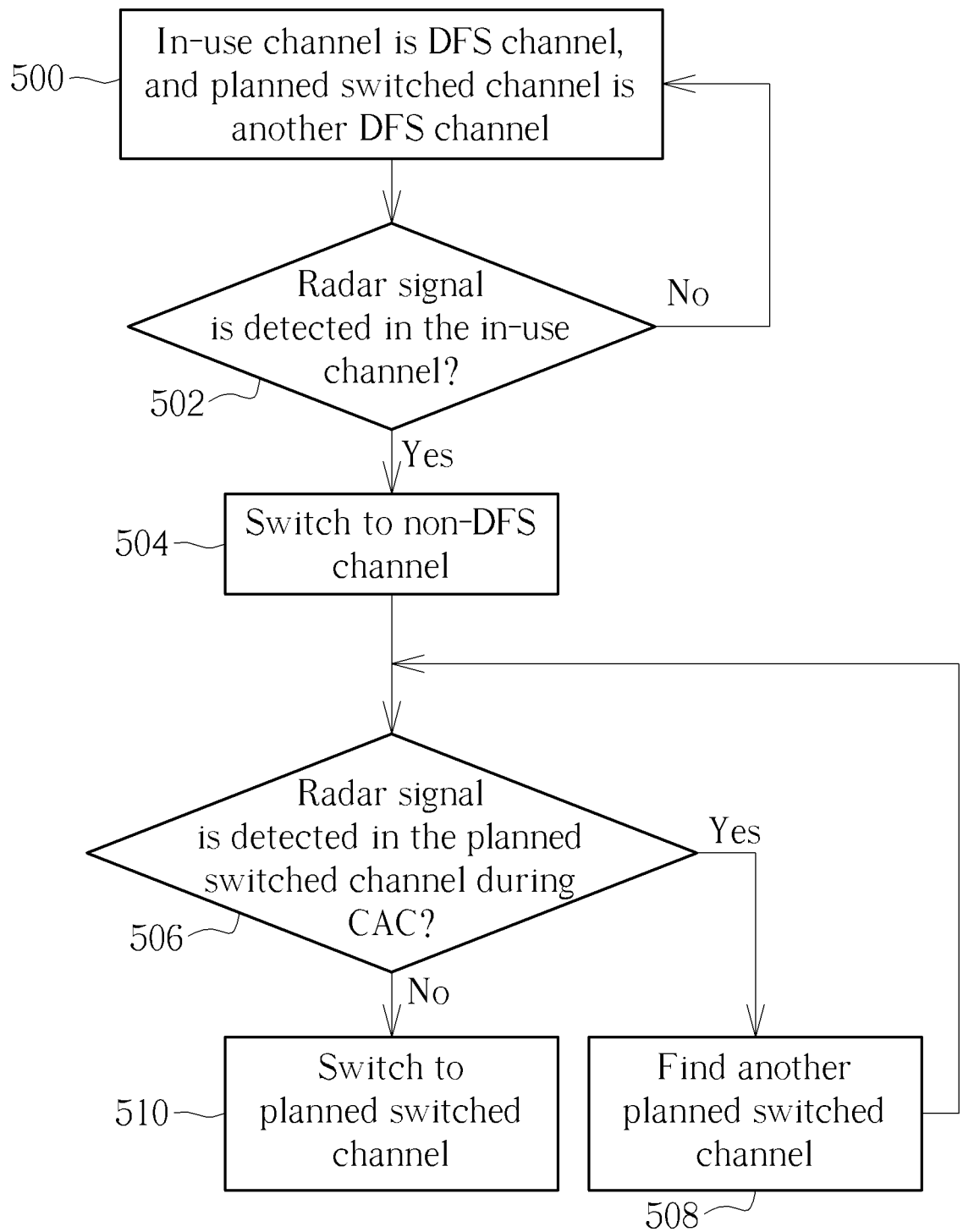
FIG. 5 shows a flowchart of the embodiment shown in FIG. 4.

FIG. 5 shows a flowchart of the embodiment shown in FIG. 4. In Step 500, the in-use channel of the communication path 120 is a DFS channel, and the planned switched channel is another DFS channel. In Step 502, the processor 110 determines if a Radar signal is detected in the in-use channel, if yes, the flow enters Step 504; and if not, the flow goes back to Step 500. In Step 504, the processor 110 controls the communication path 120 to switch from the in-use DFS channel to a non-DFS channel. In Step 506, the processor 110 determines if a Radar signal is detected in the planned switched channel (e.g. CH116 shown in FIG. 4) during the execution period of CAC, if yes, the flow enters Step 508; and if not, the flow enters Step 510. In Step 508, the processor 110 finds another planned switched channel according to the information provided by the clear channel detection circuit 136 and the DFS channel check circuit 138, and the flow goes to Step 506. In Step 510, the processor 110 controls the communication path 120 to switch from the in-use DFS channel to the planned switched channel.

Briefly summarized, in the wireless communication circuitry of the present invention, by using a dedicated channel detection path to detect the channels while the communication path keeps communicating with other devices, the communication path can switch to a better channel as soon as possible if it is determined that the in-use channel is inappropriate. In addition, the wireless communication circuitry can always communicate with the other devices even if a clear channel detection and a CAC operation is executed.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless communication circuitry, comprising:
   a processor;
   a communication path, configured to wirelessly communicate with an electronic device by using a first channel; and
   a channel detection path, configured to detect at least one channel different from the first channel to generate a detection result while the communication path is wirelessly communicating with the electronic device by using the first channel;
   wherein processor determines a second channel based on the detection result, and the processor controls the communication path to switch to the second channel from the first channel to communicate with the electronic device;
   wherein the channel detection path comprises:
   a radio frequency (RF) circuit, configured to receive a signal;
   a baseband circuit, coupled to the RF circuit, wherein the signal is sequentially processed by the RF circuit and the baseband circuit to generate a processed signal;
   a clear channel detection circuit, coupled to the baseband circuit, configured to detect clearness of a plurality of channels to generate a first detection result according to the processed signal; and
   a dynamic frequency selection (DFS) channel check circuit, configured to detect/monitor the at least one channel for a channel availability check (CAC) requirement to generate a second detection result according to the processed signal;
   wherein the first detection result and the second detection result serve as the detection result of the channel detection path.

2. The wireless communication circuitry of claim 1, wherein the channel detection path is a dedicated path, the channel detection path receives signals from an antenna module to detect the at least one channel to generate the detection result, and the channel detection path does not transmit valid data to the electronic device via the antenna module.

3. The wireless communication circuitry of claim 1, wherein the processor refers to the first detection result to select the second channel, and if the specific channel is a non-DFS channel, the processor controls the communication path to switch to the second channel from the first channel to communicate with the electronic device, without controlling the DFS channel check circuit to detect/monitor the second channel for the CAC requirement; and if the specific channel is a DFS channel, the DFS channel check circuit to detect/monitor the second channel for the CAC requirement, and the processor controls the communication path to switch to the second channel from the first channel to communicate with the electronic device when the second channel passes the CAC requirement.

4. The wireless communication circuitry of claim 1, wherein the first channel is a non-DFS channel and the second channel is a DFS channel; and when the wireless communication circuitry is powered on, and the second channel is a default channel, the communication path directly uses the first channel to wirelessly communicate with the electronic device, and the channel detection path starts to detect/monitor the second channel for a CAC requirement, and the processor controls the communication path to switch to the second channel from the first channel to communicate with the electronic device when the second channel passes the CAC requirement.

5. The wireless communication circuitry of claim 1, wherein the first channel is a non-DFS channel and the second channel is a DFS channel; and when the processor determines to use the second channel to communicate with the electronic device, the channel detection path starts to detect/monitor the second channel for a CAC requirement while the communication path still uses the first channel to wirelessly communicate with the electronic device; and the processor controls the communication path to switch to the second channel from the first channel to communicate with the electronic device when the second channel passes the CAC requirement.

6. The wireless communication circuitry of claim 1, wherein the first channel is a first DFS channel and the second channel is a second DFS channel; and when the processor determines to use the second channel to communicate with the electronic device, the channel detection path starts to detect/monitor the second channel for a CAC requirement while the communication path still uses the first channel to wirelessly communicate with the electronic device; and once a Radar signal corresponding to the first channel is detect, but the second channel has not passed the CAC requirement, the processor controls the communication path to switch to a non-DFS channel from the first channel to communicate with the electronic device while the channel detection path continuous detecting/monitoring the second channel for the CAC requirement; and the processor controls the communication path to switch to the second channel from the non-DFS channel to communicate with the electronic device when the second channel passes the CAC requirement.

7. A wireless communication method, comprising:
   controlling a communication path to wirelessly communicate with an electronic device by using a first channel;

controlling a channel detection path to detect at least one channel different from the first channel to generate a detection result while the communication path is wirelessly communicating with the electronic device by using the first channel;

determining a second channel based on the detection result; and controlling the communication path to switch to the second channel from the first channel to communicate with the electronic device;

wherein the step of controlling the channel detection path to detect at least one channel different from the first channel to generate the detection result while the communication path is wirelessly communicating with the electronic device by using the first channel comprises:

detecting clearness of a plurality of channels to generate a first detection result according to the processed signal; and detecting/monitoring the at least one channel for a channel availability check (CAC) requirement to generate a second detection result according to the processed signal;

wherein the first detection result and the second detection result serve as the detection result of the channel detection path.

8. The wireless communication method of claim 7, wherein the channel detection path is a dedicated path, the channel detection path receives signals from an antenna module to detect the at least one channel to generate the detection result, and the channel detection path does not transmit valid data to the electronic device via the antenna module.

9. The wireless communication method of claim 7, wherein the second channel is determined based on the first detection result, and the step of controlling the communication path to switch to the second channel from the first channel to communicate with the electronic device comprises:

if the specific channel is a non-DFS channel, controlling the communication path to switch to the second channel from the first channel to communicate with the electronic device, without detecting/monitoring the second channel for the CAC requirement; and if the specific channel is a DFS channel, detecting/monitoring the second channel for the CAC requirement, and controlling the communication path to switch to the second channel from the first channel to communicate with the electronic device when the second channel passes the CAC requirement.

10. The wireless communication method of claim 7, wherein the first channel is a non-DFS channel and the second channel is a DFS channel, and the control steps and the determining step comprises:

when a wireless communication circuitry for executing the wireless communication method is powered on, and the second channel is a default channel, controlling the communication path to directly use the first channel to wirelessly communicate with the electronic device, and controlling the channel detection path to detect/monitor the second channel for a CAC requirement; and controlling the communication path to switch to the second channel from the first channel to communicate with the electronic device when the second channel passes the CAC requirement.

11. The wireless communication method of claim 7, wherein the first channel is a non-DFS channel and the second channel is a DFS channel, and the control steps and the determining step comprises:

when it is determined that the second channel is prepared to be used to communicate with the electronic device, controlling the channel detection path to detect/monitor the second channel for a CAC requirement while the communication path still uses the first channel to wirelessly communicate with the electronic device; and controlling the communication path to switch to the second channel from the first channel to communicate with the electronic device when the second channel passes the CAC requirement.

12. The wireless communication method of claim 7, wherein the first channel is a first DFS channel and the second channel is a second DFS channel, and the control steps and the determining step comprises:

when it is determined that the second channel is prepared to be used to communicate with the electronic device, controlling the channel detection path to detect/monitor the second channel for a CAC requirement while the communication path still uses the first channel to wirelessly communicate with the electronic device;

if a Radar signal corresponding to the first channel is detect, but the second channel has not passed the CAC requirement, controlling the communication path to switch to a non-DFS channel from the first channel to communicate with the electronic device while the channel detection path continuous detecting/monitoring the second channel for the CAC requirement; and controlling the communication path to switch to the second channel from the non-DFS channel to communicate with the electronic device when the second channel passes the CAC requirement.

* * * * *